(12) United States Patent
Benedict

(10) Patent No.: US 10,078,541 B2
(45) Date of Patent: Sep. 18, 2018

(54) VALIDATE WRITTEN DATA

(71) Applicant: HEWLETT PACKARD ENTERPRISE DEVELOPMENT LP, Houston, TX (US)

(72) Inventor: Melvin K. Benedict, Magnolia, TX (US)

(73) Assignee: Hewlett Packard Enterprise Development LP, Houston, TX (US)

(*) Notice: Subject to any disclaimer, the term of this patent is extended or adjusted under 35 U.S.C. 154(b) by 59 days.

(21) Appl. No.: 14/912,331

(22) PCT Filed: Sep. 23, 2013

(86) PCT No.: PCT/US2013/061233
§ 371 (c)(1),
(2) Date: Feb. 16, 2016

(87) PCT Pub. No.: WO2015/041701
PCT Pub. Date: Mar. 26, 2015

(65) Prior Publication Data
US 2016/0188399 A1 Jun. 30, 2016

(51) Int. Cl.
G06F 11/00 (2006.01)
G06F 11/07 (2006.01)
G06F 11/10 (2006.01)

(52) U.S. Cl.
CPC ...... *G06F 11/0763* (2013.01); *G06F 11/0721* (2013.01); *G06F 11/1004* (2013.01)

(58) Field of Classification Search
CPC ... G06F 11/0763; G06F 11/0721; G06F 11/08
See application file for complete search history.

(56) References Cited

U.S. PATENT DOCUMENTS

| | | | |
|---|---|---|---|
| 6,868,516 B1 | 3/2005 | Walton et al. | |
| 7,159,123 B1 | 1/2007 | Frantz | |
| 7,836,378 B2 | 11/2010 | Shaeffer et al. | |
| 7,865,784 B1 | 1/2011 | White et al. | |
| 8,042,023 B2 | 10/2011 | Balb | |
| 8,359,521 B2 | 1/2013 | Kim et al. | |
| 2008/0288829 A1 | 11/2008 | Ohashi et al. | |
| 2009/0213487 A1 | 8/2009 | Luan et al. | |
| 2009/0327800 A1* | 12/2009 | Kim | G06F 11/1044 714/5.11 |
| 2010/0325519 A1* | 12/2010 | Lyon | G11B 20/1833 714/758 |
| 2011/0066925 A1* | 3/2011 | Smith | G06F 11/10 714/805 |

(Continued)

OTHER PUBLICATIONS

Cooper-Balis; "Buffer-on-Board Memory System", < http://www.eng.umd.edu/~blj/papers/thesis-PhD-ecc--BOB.pdf >, 2012 (172 pages).

(Continued)

*Primary Examiner* — Thien Nguyen
(74) *Attorney, Agent, or Firm* — Trop, Pruner & Hu, P.C.

(57) ABSTRACT

Data and a first error detection code related to the data is received. That the received data is written correctly to a memory is validated based on the first error detection code and/or a comparison of the written data to the received data. An alert is generated if it is determined that the written data is incorrect.

18 Claims, 6 Drawing Sheets

(56) References Cited

U.S. PATENT DOCUMENTS

2011/0078538 A1* 3/2011 Ikegawa ............. G11C 11/1675
714/758
2011/0225475 A1* 9/2011 Kumar ................ G06F 11/1052
714/763

OTHER PUBLICATIONS

International Searching Authority, The International Search Report and the Written Opinion for PCT/US2013/061233 dated Jun. 20, 2014, 10 Pages.

* cited by examiner

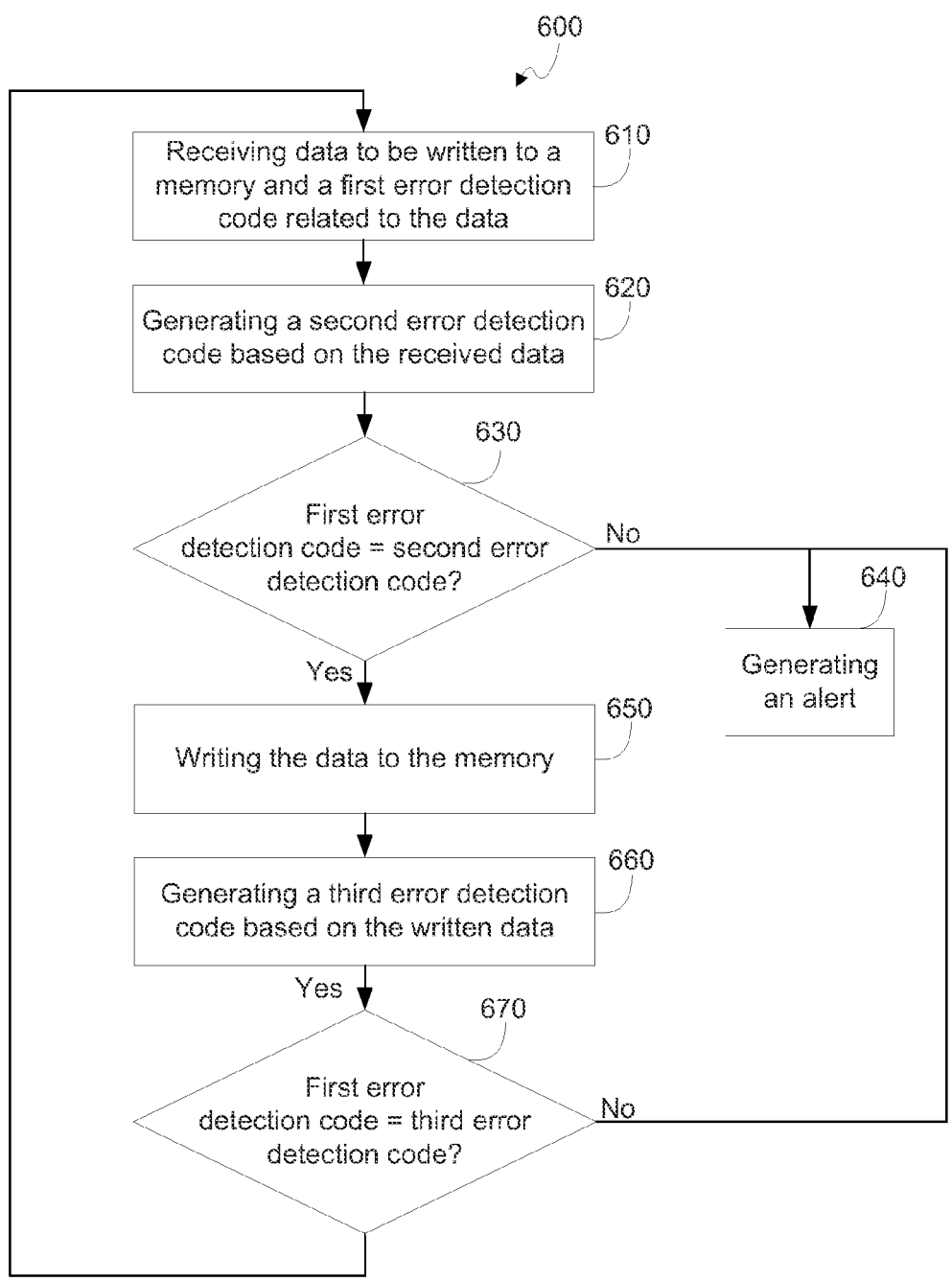

VALIDATE WRITTEN DATA

BACKGROUND

A controller may receive data to be written to a memory. The controller may transmit the data to the memory and the memory may store the data. Manufacturers, vendors and/or suppliers are challenged to provide users with more accurate methods for ensuring that data is written correctly to the memory.

BRIEF DESCRIPTION OF THE DRAWINGS

The following detailed description references the drawings, wherein:

FIG. 6 is another example flowchart of a method for validating that data written to a memory is correct.

DETAILED DESCRIPTION

Specific details are given in the following description to provide a thorough understanding of embodiments. However, it will be understood that embodiments may be practiced without these specific details. For example, systems may be shown in block diagrams in order not to obscure embodiments in unnecessary detail. In other instances, well-known processes, structures and techniques may be shown without unnecessary detail in order to avoid obscuring embodiments.

A controller, such as a memory controller, may seek to ensure that data it sends to a memory, such as a dynamic random access memory (DRAM), is received correctly, or else corrupted data may be written to the memory. Memory controllers and memories may communicate via a double data rate (DDR) mechanism. Some types of double data rate (DDR) mechanisms may include link protection by sending an error detection code with the data along the link between the memory controller and the memory.

For example, in fourth generation DDR (DDR4), a memory controller may generate a cyclic redundancy check (CRC) for each data packet sent during write operations to the DRAM. In turn, the DRAM may check for a valid CRC prior to storing the data. If the CRC check fails, the DRAM may signal to the memory controller to resend the data. However, current mechanisms do not further check if the data is still correct after being written to the DRAM.

Examples may provide a mechanism to validate that data has been written correctly to a memory, such as DRAM. An example device may include a receiving unit, a validation unit, and an alert unit. The receiving unit may receive data and a first error detection code related to the received data. The validation unit may validate that the received data is written correctly to a memory, based on the first error detection code and/or a comparison of the written data to the received data. The alert unit may generate an alert if the validation unit determines that the written data is incorrect.

Thus, examples may enable write checking and write retry without sending the data back to the controller to verify if the written data is correct. These and other examples described herein nay, in some cases, may improve system reliability, enhance customer experience, and/or reduce service costs.

Figure 1:
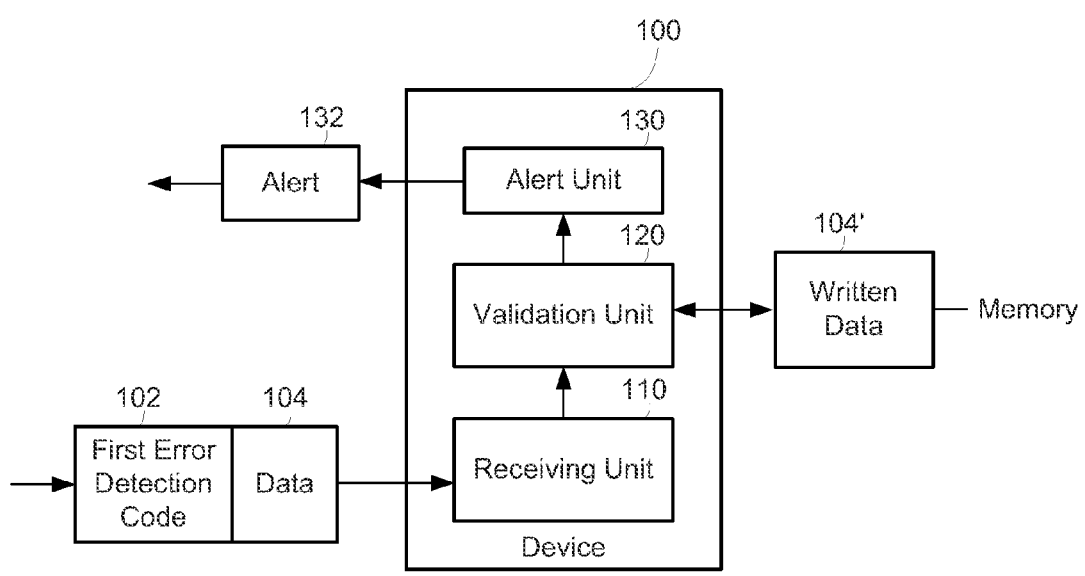
FIG. 1 is an example block diagram of a device to validate that data is written correctly to a memory.

Referring now to the drawings, FIG. 1 is an example block diagram of a device 100 to validate that data is written correctly to a memory. The device 100 may interface with or be included in any type of device including a memory and/or a controller, such as a DRAM, memory controller, a notebook computer, a desktop computer, an all-in-one system, a server, a network device, a wireless device, a storage device, a mobile device, a thin client, a retail point of sale device, a gaming device, a scientific instrument, and the like.

In FIG. 1, the device 100 is shown to include a receiving unit 110, a validation unit 120 and an alert unit 130. The receiving, validation and alert units 110, 120 and 130 may include, for example, a hardware device including electronic circuitry for implementing the functionality described below, such as control logic and/or memory. In addition or as an alternative, the receiving, validation and alert units 110, 120 and 130 may be implemented as a series of instructions encoded on a machine-readable storage medium and executable by a processor.

The receiving unit 110 may receive data 104 and a first error detection code 102 related to the received data 104. The data 104, for example, may be a packet or datagram sent from a controller or processor (not shown) to be written to a memory (not shown). The term error detection code may refer to any coding scheme that allows for detection of errors caused by noise or other impairments during transmission from a transmitter to a receiver, such as from the controller to a memory device or from a memory interface to a storage element within the memory device. The error detection code may be realized using a suitable hash function or checksum algorithm.

For example, a hash function at the controller sending the data 104 may add a fixed-length tag to the data 104, such as the first error detection code 102, which enables a receiver, such as the device 100, to verify the received data 104 by recomputing the tag and comparing it with the one provided. There may exist a vast variety of different hash function designs. Example types of error detection code may include repetition code, parity bit, checksum, cyclic redundancy check (CRC), cryptographic hash function, and the like.

The validation unit 120 may validate that the received data 104 is written correctly to the memory, based on at least one of the first error detection code 102 and a comparison of the written data 104' to the received data 104. The validation unit 120 will be explained in greater detail below with respect to FIGS. 2 and 3. The alert unit 130 may generate an alert 132 if the validation unit 120 determines that the written data 104' is incorrect.

Figure 2:
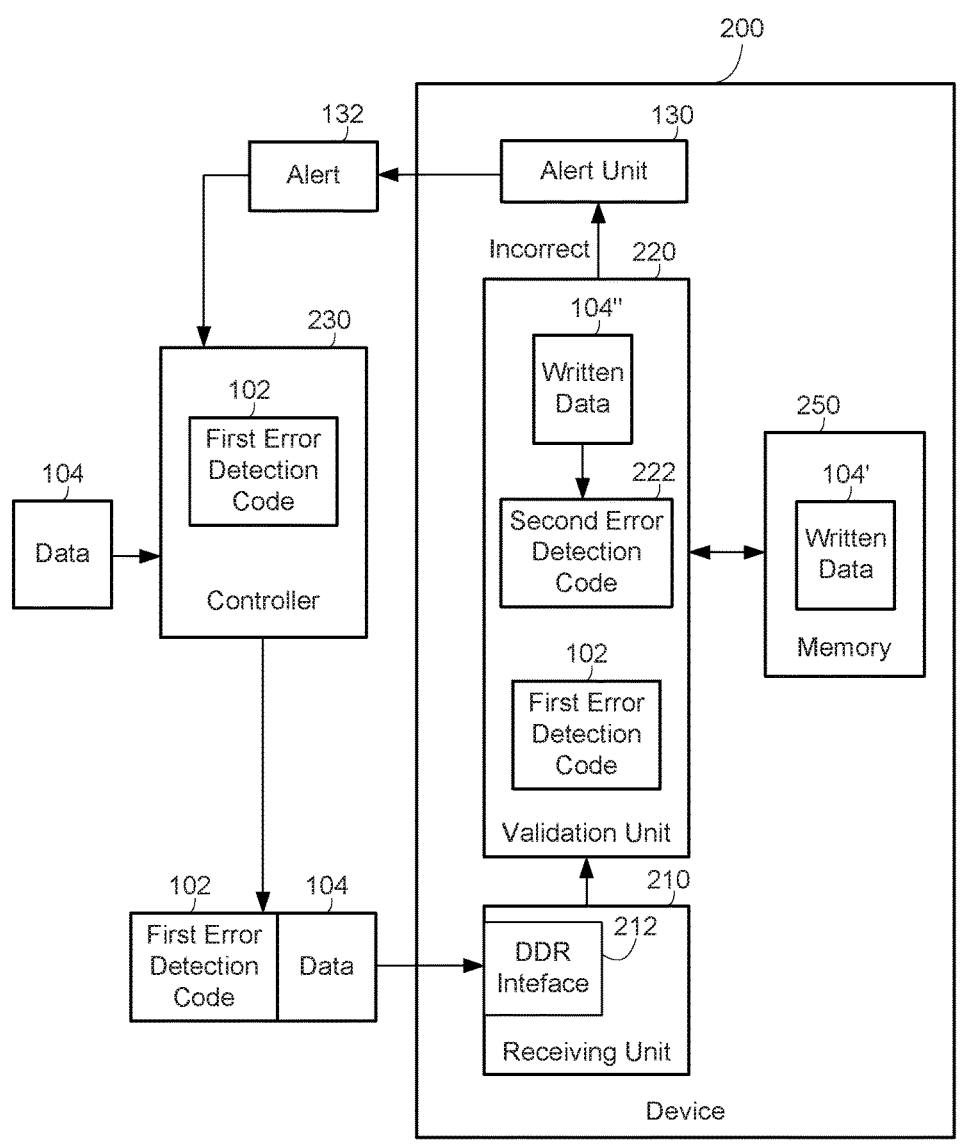
FIG. 2 is another example block diagram of a device to validate that data is written correctly to a memory.

FIG. 2 is another example block diagram of a device 200 to validate that data 104 is written correctly to a memory 250. The device 200 may interface with or be included in any type of device including a memory and/or a controller, such as a DRAM, memory controller, a notebook computer, a desktop computer, an all-in-one system, a server, a network device, a wireless device, a storage device, a mobile device, a thin client, a retail point of sale device, a gaming device, a scientific instrument, and the like.

Here, the device 200 is shown to include a memory 250 and interface with a controller 230. While FIG. 2 shows the device 200 to be integrated with the memory 250, examples may also include the device 200 being separate from the memory 250. Example types of the memory 250 may be Random Access Memory (RAM) like synchronous dynamic random-access memory (SDRAM), dynamic random access memory (DRAM), or graphics RAM. Further example types of the memory 250 may include NAND flash memory and main memory.

The controller 230 may include, for example, a hardware device including electronic circuitry for implementing the functionality described below, such as control logic and/or memory. In addition or as an alternative, the controller 230 may be implemented as a series of instructions encoded on a machine-readable storage medium and executable by a processor. The controller 230 may be a memory controller or any other type of device that manages a flow of data going to and from one or more memories, like the memory 250. The controller 230 may also manage the flow of data going to and from a processor or cache (not shown).

The device 200 of FIG. 2 may include the functionality and/or hardware of the device 100 of FIG. 1. For example, the device 200 includes the alert unit 130. Further, the receiving unit 210 and a validation unit 220 included in the device 200 of FIG. 2 may include at least the functionality and/or hardware of the receiving unit 110 and the validation unit 120 of device 100 of FIG. 1.

The controller 230 may receive the data 104, such as from a processor, and generate the first error detection code 102 based on the data 104. Next, the controller 230 may send the data 104 and the first error detection code 102 to the receiving unit 220 of the device 200.

In FIG. 2, the receiving unit 210 is shown to have a double data rate (DDR) interface 212. The DDR interface 212 may allow the controller 230 and/or the device 200 to transfer data on both rising and falling edges of a clock signal along a bus. The DDR interface 212 may include any generation of DDR, such as DDR first generation (DDR1) through DDR fourth generation (DDR4). Afterward, the data 104' is written to the memory 250, such as to a storage element (not shown) of an array of storage elements (not shown) of the memory 250.

Then, the validation unit 220 may generate a second error detection code 222 based on the written data 104'. For example, assuming the first error detection code 102 is a CRC, the validation unit 220 may read the written data 104' from memory 250 as written data 104" and calculate its CRC to generate the second error detection code 222. Next, the validation unit 220 may validate the written data 104' as correct if the second error detection code 222 matches the first error detection code 102. On the other hand, the validation unit 220 may invalidate the written data 104' as incorrect if the second error detection code 222 does not match the first error detection code 102.

As noted above, the validation unit 220 may signal the written data 104' is incorrect to the alert unit 130. In turn, the alert unit 130 may generate an alert 132. The controller 230 may receive the alert 312 and retransmit the data 104 to the receiving unit 210 in response to the alert 132. Thus, examples may close a data reliability hole, by verifying that data 104' is written correctly to the memory 250 without requiring the data 104' to be sent back to the controller 230 for validation.

Figure 3:
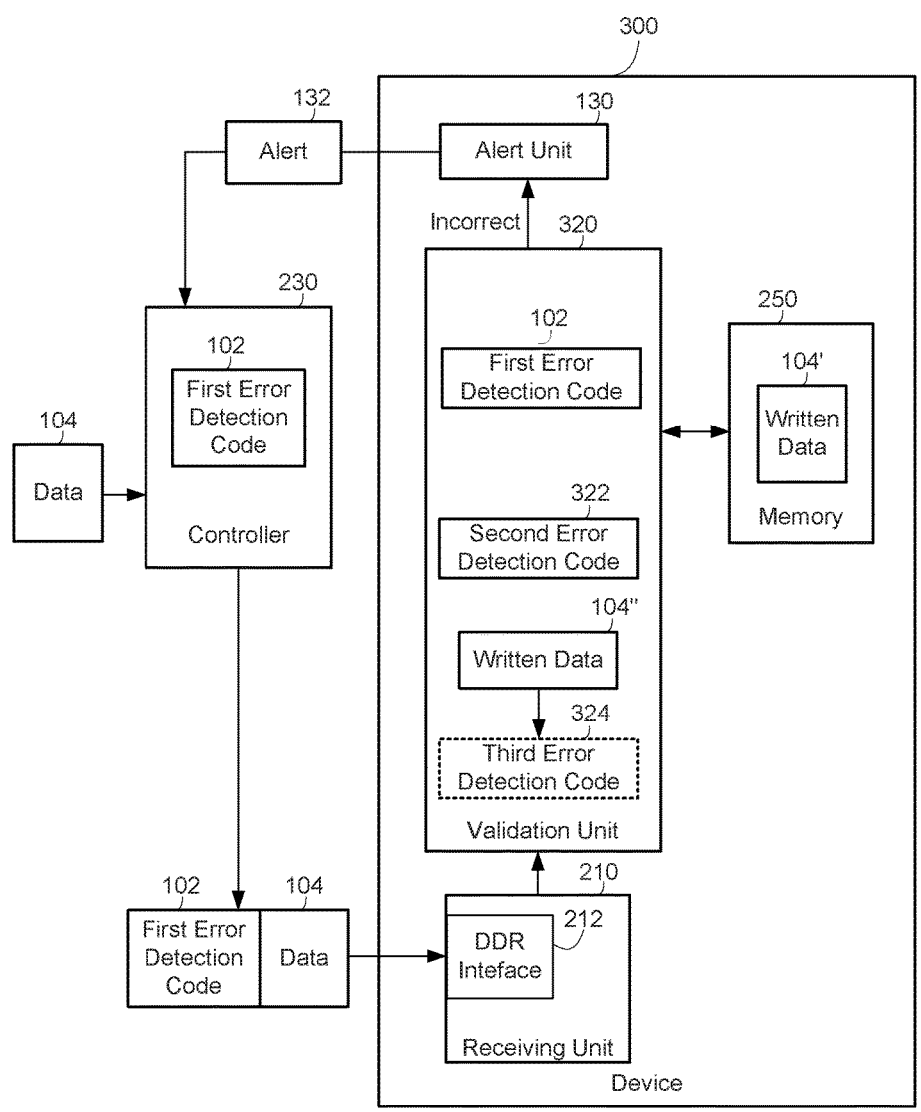
FIG. 3 is yet another example block diagram of a device to validate that data is written correctly to a memory.

FIG. 3 is yet another example block diagram of a device 300 to validate that data 104 is written correctly to a memory 250. The device 300 may interface with or be included in any type of device including a memory and/or a controller, such as a DRAM, memory controller, a notebook computer, a desktop computer, an all-in-one system, a server, a network device, a wireless device, a storage device, a mobile device, a thin client, a retail point of sale device, a gaming device, a scientific instrument, and the like.

Here, the device 300 is shown to include the memory 250 and interface with the controller 230 of FIG. 2. While FIG. 3 shows the device 300 to be integrated with the memory 250, examples may also include the device 300 being separate from the memory 250. The device 300 of FIG. 2 may include the functionality and/or hardware of the device 100 of FIG. 1 and/or the device 200 of FIG. 2. For example, the device 300 includes the alert unit 130 of FIG. 1 and the receiving unit 210 of FIG. 2. Further, a validation unit 320 included in the device 300 of FIG. 3 may include at least the functionality and/or hardware of the validation unit 120 of device 100 of FIG. 1.

As noted above, the validation unit 320 may receive the data 104 and the first error detection code 102 from the controller 230. The validation unit 320 may validate if the received data 104 is correct before the received data 104 is written as written data 104' to the memory 250 based on the first error detection code 102. For example, the validation unit 320 may generate a second error detection code 322 based on the received data 104, before the received data 104 is written to the memory 250. For instance, the validation unit 320 may run a coding scheme on the received data 104 to generate the second error detection code 32, such as a CRC.

Then, the validation unit 320 may compare the second error detection code 322 to the first error detection code 102, to determine if the received data 104 is correct. The validation unit 320 may invalidate the received data 104 as incorrect if the second error detection code 322 does not match the first error detection code 102. The received data 104 may not be written to the memory 250 if the received data 104 is incorrect. Further, the validation unit 320 may cause the alert unit 130 to generate the alert if the received data 104 is incorrect. On the other hand, the validation unit 320 may validate the received data 104 as correct if the second error detection code 322 matches the first error detection code 102. The received data 104 may be written to the memory 250 if the received data 104 is correct.

In one example, after the data 104' is written to memory 250, the validation unit 320 may read the written data 104' from the memory as written data 104" and generate a third error detection code 324 based on the written data 104". The validation unit 320 may then compare the third error detection code 324 to the first error detection code 102 to validate the written data 104'. The validation unit 320 may invalidate the received data 104 as incorrect if the third error detection code 324 does not match the first error detection code 102. As noted above, the validation unit 320 may cause the alert unit 130 to generate the alert if the written data 104' is incorrect.

On the other hand, the validation unit 320 may validate the received data 104 as correct if the third error detection code 324 matches the first error detection code 102. Thus, the data 104 may be validated both when it is received and after it is written to the memory 250, based on calculating error detection codes 322 and 324 before and after storing the data 104, and comparing the calculated error detection codes 322 and 324 to the received first error detection code 102.

In another example, the validation unit 320 may not calculate the third error detection code 324 to verify if the written data 104' is correct. Instead, the validation unit 320 may compare the received data 104 to the written data 104". The validation unit 320 may validate the written data 104' as correct, if the written data 104" matches the received data 104. The validation unit 320 may invalidate the written data 104' as incorrect if the written data 104" does not match the received data 104. Thus, similar to the above example, the data 104 may also be validated here both when it is received and after it is written to the memory 250. However, in this example, the written data 104' may be validated based on a comparison to the received data 104, not the third error detection code 324.

Figure 4:
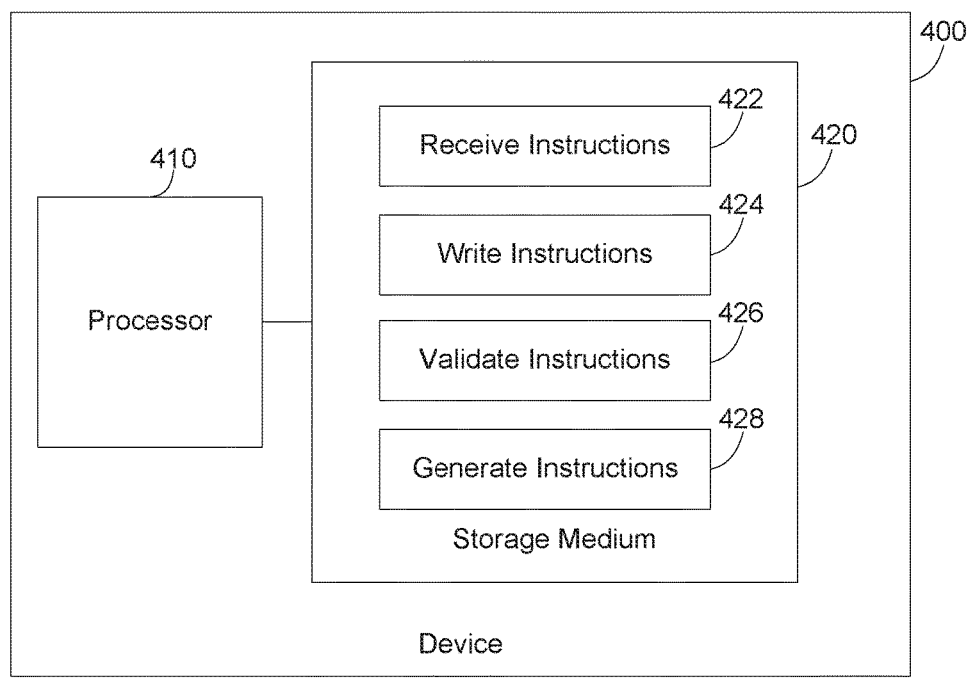
FIG. 4 is an example block diagram of a computing device including instructions for validating that data written to a memory is correct.

FIG. 4 is an example block diagram of a computing device 400 including instructions for validating that data written to a memory is correct. In the embodiment of FIG. 4, the computing device 400 includes a processor 410 and a machine-readable storage medium 420. The machine-readable storage medium 420 further includes instructions 422, 424, 426 and 428 for validating that data written to a memory (not shown) is correct.

The computing device 400 may be, for example, a secure microprocessor, a notebook computer, a desktop computer, an all-in-one system, a server, a network device, a controller, a wireless device, or any other type of device capable of executing the instructions 422, 424, 426 and 428. In certain examples, the computing device 400 may include or be connected to additional components such as memories, controllers, etc.

The processor 410 may be, at least one central processing unit (CPU), at least one semiconductor-based microprocessor, at least one graphics processing unit (GPU), a microcontroller, special purpose logic hardware controlled by microcode or other hardware devices suitable for retrieval and execution of instructions stored in the machine-readable storage medium 420, or combinations thereof. The processor 410 may fetch, decode, and execute instructions 422, 424, 426 and 428 to implement validating that data written to the memory is correct. As an alternative or in addition to retrieving and executing instructions, the processor 410 may include at least one integrated circuit (IC), other control logic, other electronic circuits, or combinations thereof that include a number of electronic components for performing the functionality of instructions 422, 424, 426 and 428.

The machine-readable storage medium 420 may be any electronic, magnetic, optical, or other physical storage device that contains or stores executable instructions. Thus, the machine-readable storage medium 420 may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium 420 can be non-transitory. As described in detail below, machine-readable storage medium 420 may be encoded with a series of executable instructions for validating that data written to the memory is correct.

Figure 5:
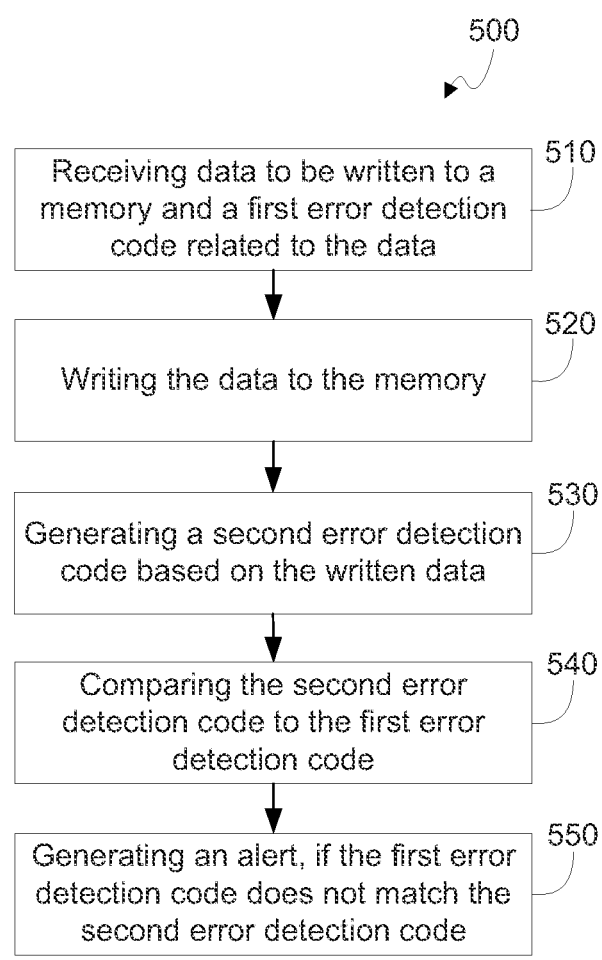
FIG. 5 is an example flowchart of a method for validating that data written to a memory is correct.

Moreover, the instructions 422, 424, 426 and 428 when executed by a processor (e.g., via one processing element or multiple processing elements of the processor) can cause the processor to perform processes, such as, the process of FIG. 5. For example, the receive instructions 422 may be executed by the processor 410 to receive a first error detection code related to the data to be written to the memory. The write instructions 424 may be executed by the processor 410 to write the received data to the memory. The validate instructions 426 may be executed by the processor 410 to validate that the data written to the memory is correct based on at least one the first error detection code and a comparison of the written data to the received data.

For example, instructions may be executed by the processor 410 to generate a second error detection code based on the written data. The second error detection code may be compared to the first error detection code to validate if the written data is correct for the validate instructions 426. Optionally, additional instructions may be executed by the processor 410 to generate a third error detection code based on the received data. In this case, the validate instructions 426 may be executed by the processor 410 to validate that the received data is correct based on a comparison of the first error detection code to the third error detection code, before the received data is written to the memory. Thus, the data may be validated both when it is received and after it is written to the memory.

In another example, the additional instructions may still be executed by the processor 410 to generate the third error detection code, as explained above. However, instead of generating the second error detection code, the written data may be compared to the received memory to validate if the written data is correct for the validate instructions 426. Thus, similar to the above example, the data may also be validated here both when it is received and after it is written to the memory. However, in this example, the data may be validated after is to written to the memory based on a comparison to the received data, not the second error detection code.

The generate instructions 428 may be executed by the processor 410 to generate an error if the written data is incorrect. The error is to be sent to a controller (not shown) that sent the data to the memory. Thus, the written data may be validated without sending the data back to the controller.

FIG. 5 is an example flowchart of a method 500 for validating that data written to a memory is correct. Although execution of the method 500 is described below with reference to the device 200, other suitable components for execution of the method 500 can be utilized, such as the device 100. Additionally, the components for executing the method 500 may be spread among multiple devices (e.g., a processing device in communication with input and output devices). In certain scenarios, multiple devices acting in coordination can be considered a single device to perform the method 500. The method 500 may be implemented in the form of executable instructions stored on a machine-readable storage medium, such as storage medium 420, and/or in the form of electronic circuitry.

At block 510, the device 200 receives data 104 to be written to a memory 250 and a first error detection code 102 related to the data 104. Then, at block 520, the device 200 writes the data 104' to the memory 250. Next, at block 530, the device 200 generates a second error detection code 222 based on the written data 104'. Afterward, at block 540, the device 200 compares the second error detection code 222 to the first error detection code 102 to validate that the written data 104' is correct. Lastly, at block 550, the device 200 generates an alert 132, if the first error detection code 102 does not match the second error detection code 222.

FIG. 6 is another example flowchart of a method for validating that data written to a memory is correct. Although execution of the method 600 is described below with reference to the device 300, other suitable components for execution of the method 600 can be utilized, such as the device 100. Additionally, the components for executing the method 600 may be spread among multiple devices (e.g., a processing device in communication with input and output devices). In certain scenarios, multiple devices acting in coordination can be considered a single device to perform the method 600. The method 600 may be implemented in the form of executable instructions stored on a machine-readable storage medium, such as storage medium 420, and/or in the form of electronic circuitry.

At block 610, the device 300 receives data 104 to be written to a memory 250 and a first error detection code 102 related to the data 104. Then, at block 620, the device 300 generates a second error detection code 322 based on the received data 104. Next, at block 630, the device compares the second error detection code 322 to the first error detection code 102. If the second error detection code 322 does not match the first error detection code 102, the method 600 flows to block 640, where the device 300 generates an alert. Otherwise, if the second error detection code 322 does match the first error detection code 102, the method 600 flows to block 650, where the device 300 write the data 104 to the memory 250.

Next, at block 660, the device 300 generates a third error detection code 324 based on the written data 104'. Afterward, at block 670, the device 300 compares the third error detection code 324 to the first error detection code 102 to validate that the written data 104' is correct. If the third error detection code 324 does not match the first error detection code 102, the method 600 flows back to block 640, where the device 300 generates the alert. Otherwise, if the third error detection code 324 does match the first error detection code 102, the method 600 flows back to the beginning at block 610.

I claim:

1. A device, comprising:
a memory; and
a processor to:
receive, from a source, first data and a first error detection code related to the first data;
write the first data to the memory to store written first data in the memory;
validate that the first data is written correctly to the memory, the validating comprising reading the written first data from the memory to produce read data, and performing a comparison that comprises:
comparing a second error detection code generated based on the read data with the first error detection code received from the source; and
generate an alert if the validating determines that the first data written to the memory is incorrect.

2. The device of claim 1, wherein the processor is to further:
before writing the first data to the memory, validate if the first data is correct based on the first error detection code received from the source,
wherein the writing of the first data to the memory is in response to validating that the first data is correct.

3. The device of claim 2, wherein the processor is to:
generate a third error detection code based on the first data, before the first data is written to the memory; and
compare the third error detection code to the first error detection code, to validate if the first data is correct.

4. The device of claim 3, wherein the processor is to:
indicate that the first data is incorrect if the third error detection code does not match the first error detection code; and
indicate that the first data is correct if the third error detection code matches the first error detection code.

5. The device of claim 1, wherein the processor is to:
generate the second error detection code based on the read data; and
indicate that the first data written to the memory is incorrect if the second error detection code does not match the first error detection code.

6. The device of claim 1, further comprising
a controller to generate the first error detection code based on input data before sending the input data to the processor, the input data received on the first data by the processor, and
the controller is to receive the alert and to retransmit the input data to the processor in response to the alert.

7. The device of claim 1, further comprising:
a double data rate (DDR) memory interface to receive the first data,
wherein the first error detection code is a cyclic redundancy check (CRC), and the memory is a dynamic random-access memory (DRAM).

8. A method, comprising:
receiving, by a device from a source, first data to be written to a memory and a first detection code related to the first data;
writing, by the device, the first data to the memory to store written first data in the memory;
after the writing, reading, by the device, the written first data from the memory to produce read data;
generating, by the device, a second error detection code based on the read data;
comparing, by the device, the second error detection code to the first error detection code received from the source to validate that the first data is correctly written to the memory; and
generating, by the device, an alert in response to the first error detection code not matching the second error detection code.

9. The method of claim 8, further comprising:
before the writing, generating a third error detection code based on the first data;
comparing the third error detection code to the first error detection code; and
generating an alert in response to the first error detection not matching the third detection code.

10. The method of claim 8, wherein the source is a controller, the method further comprising:
sending, by the device to the controller, the alert; and
receiving, by the device from the controller, a retransmission of the first data responsive to the alert sent to the controller.

11. A non-transitory computer-readable storage medium storing instructions that upon execution cause a device to:
receive, from a source, a first error detection code related to first data to be written to a memory;
write the first data to the memory to store written first data in the memory;
validate that the first data written to the memory is correct, the validating comprising reading the written first data from the memory to produce read data, and performing a comparison that comprises:
comparing a second error detection code generated based on the read data with the first error detection code received from the source; and
generate an error if the validating indicates that the first data is incorrectly written to the memory.

12. The non-transitory computer-readable storage medium of claim 11, wherein the instructions upon execution cause the device to:
generate the second error detection code based on the read data.

13. The non-transitory computer-readable storage medium of claim 12, wherein the instructions upon execution cause the device to:

generate a third error detection code based on the first data; and validate the first data based on a comparison of the first error detection code to the third error detection code, before the first data is written to the memory.

14. The method of claim 13, wherein the writing of the first data to the memory is in response to the third error detection code matching the first error detection code.

15. The method of claim 9, further comprising:

receiving second data to be written to the memory and a fourth error detection code related to the second data;

generating a fifth error detection code based on the second data;

comparing the fifth error detection code to the fourth error detection code; and declining to write the second data to the memory in response to the fifth error detection code not matching the fourth error detection code.

16. The non-transitory computer-readable storage medium of claim 11, wherein the instructions upon execution cause the device to:

send the error to a controller that sent the first data to the device.

17. The non-transitory computer-readable storage medium of claim 16, wherein the validating is performed without involvement of the controller.

18. The non-transitory computer-readable storage medium of claim 11, wherein the source is a controller, and wherein the instructions upon execution cause the device to:

send, to the controller, the alert; and receive, from the controller, a retransmission of the first data responsive to the alert sent to the controller.

* * * * *